United States Patent [19]

Föhl

[11] 4,442,674
[45] Apr. 17, 1984

[54] DRIVING DEVICE

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 301,044

[22] Filed: Sep. 10, 1981

[30] Foreign Application Priority Data

Sep. 11, 1980 [DE] Fed. Rep. of Germany ....... 3034258

[51] Int. Cl.³ .......................... F02N 13/00; F16J 15/00
[52] U.S. Cl. ........................................ 60/632; 92/172; 92/244; 277/205
[58] Field of Search ................. 277/205; 92/169, 240, 92/243, 245, 249, 244, 120, 172, 251, 261; 60/632, 635, 636, 637; 244/122 AG; 280/801, 802, 805; 137/68 A, 238

[56] References Cited

U.S. PATENT DOCUMENTS

| 2,707,002 | 4/1955 | Harris | 92/172 |
| 3,023,576 | 3/1962 | Musgrave | 251/65 |
| 3,071,114 | 1/1963 | Hardy, Sr. | 92/172 |
| 3,318,202 | 5/1967 | Means | 277/205 |
| 3,576,153 | 4/1971 | Doutt | 92/244 |
| 3,871,470 | 3/1975 | Schwanz et al. | 60/635 |
| 4,246,833 | 1/1981 | Burklund | 92/172 |
| 4,281,590 | 8/1981 | Weaver | 92/244 |

Primary Examiner—Robert E. Garrett
Assistant Examiner—Richard L. Klein
Attorney, Agent, or Firm—Herbert L. Lerner; Laurence A. Greenberg

[57] ABSTRACT

Driving device with a curved cylinder in which a spherical piston is guided and can be driven by a gaseous or liquid propellant, preferably for a pyrotechnical driving device for a back-tightening device of a safety belt system. The spherical piston, the diameter of which is smaller than the smallest inside width of the cylinder is connected on the driving side to a resilient sealing element which adapts itself in accordance with the changing cross-sectional shape of the curved cylinder.

6 Claims, 5 Drawing Figures

DRIVING DEVICE

BACKGROUND OF THE INVENTION

Field of the Invention

The invention relates to a driving device with a curved cylinder in which a spherical piston is guided and which can be driven by a gaseous or liquid propellant, preferably for a pyrotechnical driving device for a back-tightening device of a safety belt system.

Description of the Prior Art

In such cylinder/piston driving devices with curved cylinder, it is not possible to use a cylindrical piston since it would jam when passing through the cylinder curvature. As a rule, a spherical piston is therefore used. However, difficulties arise inasmuch, for manufacturing reasons, the shape of the cross section in the region of the curvature deviates from the circular cross-sectional shape of straight cylinder sections when a circular cylinder tube is bent, i.e. in the region of the curvature the cross section shape is narrowed and assumes a substantially oval cross-sectional shape. For this reason it is not possible to use a spherical piston made of metal, i.e. practically non-resilient material. Rather, a material must be chosen which is elastic and can be deformed appropriately in the region of the curvature. Unfortuantely, there is the disadvantage that the elastic spherical piston when it passes through the curvature region is subjected to very strong pressure forces and friction forces to execute the change of its form, so that a major part of the energy acting on the spherical piston no longer is available for the driving purposes.

Summary of the Invention

An object of the invention is to provide a driving device of the kind mentioned at the outset, in which form-locking and therefore tight and low friction guidance of the spherical piston in the curved region of the cylinder is ensured, so that practically the entire driving energy of the gaseous or liquid propellant is available for driving the piston.

With the foregoing and other objects in view, there is provided in accordance with the invention a driving device, including a pyrotechnical driving device for a back-tightening device for a safety belt system, comprising a cylinder having a curved cylinder section in which its cross-section deviates from a circular cross-section and its width is smaller than its length as measured by the cross-section's two axes, a spherical piston in the cylinder which can be driven by a fluid propellant, said spherical piston having a diameter smaller than the smallest inside width of the cylinder, and a resilient sealing element in contact with the interior wall of the cylinder disposed on the driving side of the spherical piston which resilient sealing element during movement of the piston through the cylinder adapts itself to the changing cross-sectional shape of the curved cylinder retaining contact with the interior wall of the cylinder. Other features which are considered as characteristic for the invention are set forth in the appended claims.

Although the invention is illustrated and described herein as embodied in a driving device, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
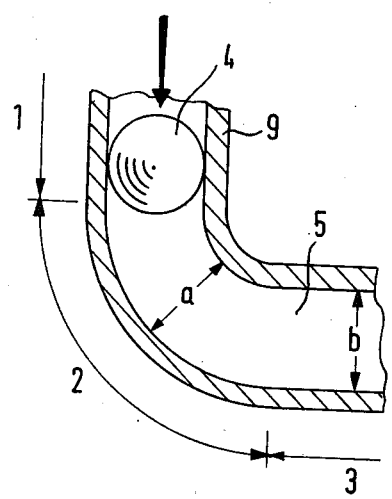
FIG. 1 schematically illustrates in partial section, a conventional driving device with curved cylinder and spherical piston, FIG. 2 diagrammatically illustrates a first embodiment of the driving device with a spherical piston and radial sealing element.

In accordance with the invention, the spherical piston has a diameter smaller than the smallest inside width of the cylinder and is connected on the driving side to a resilient sealing element which adapts itself according to the changing cross-sectional shape of the curved cylinder.

An elastic ring, made of a suitable elastomer such as a rubber composition, which is guided in a radial cut in the spherical piston and extends beyond the circumference of the sphere can be used as the sealing element. The diameter of the spherical piston is smaller than the smallest inside width in the area of the curved cylinder section. The ring-shaped sealing element can adapt itself to the cross-sectional shape of the curved cylinder. There is a possible difficulty, however, that when the spherical piston enters the curvature, the friction conditions vary and the sphere may, under some circumstances, be swiveled so that a good sealing effect is not longer assured. To avoid this possibility, the sealing element is designed, according to a preferred embodiment of the invention, in the shape of a cup, the rim of which rests against the internal cylindrical surface. In this manner, particularly if the cup-shaped sealing element is connected to the spherical piston, a position of the sealing element which remains constant relative to the cylinder axis is assured when passing the cylinder curvature. The cup-shaped sealing element, on which the driving pressure of the propellant acts directly, is reliably guided in the cylinder by the cup rim which rests against the cylinder surface, and serves as the driving element for the stable spherical piston which serves as the driving piston of the driving device.

In practice, it has been found to be particularly advantageous to attach the sealing element to a connecting post which is axial to the cylinder axis and is fastened in an axial hole of the spherical piston, and to expand the axial hole in the spherical piston in funnel shape toward the outside. In this manner, a relative motion between the spherical piston and the sealing element of the connecting pin is possible without, for instance, large shear forces acting on the connecting pin which could cause the connecting pin to be torn off.

Further advantageous details of the invention will be seen from the embodiment examples which are shown in the drawings and will be explained in the following.

Figure 2:
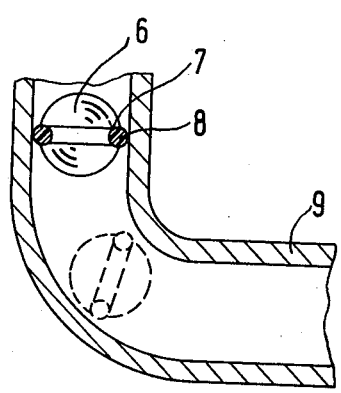
Figure 3:
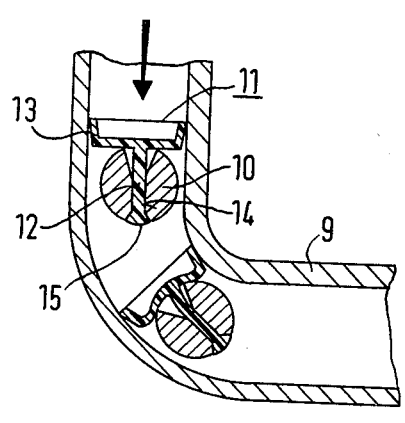
FIG. 3 is a second embodiment of the driving device according to the invention with a spherical piston and cup-shaped sealing element.
Figure 4:
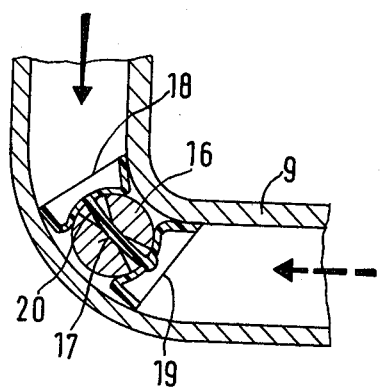
FIG. 4 is a third embodiment of the driving device according to the invention with a spherical piston and two cup-shaped sealing elements for admitting pressure alternately.

The tubular cylinder 9 according to FIG. 1, as well as according to the other FIGS. 2, 3 and 4, consists of two straight cylinder sections 1 and 3 which have a circular cross-sectional shape, and of a curved cylinder section 2, the cross-sectional shape of which deviates for manufacturing reasons from the exact circular form and has a slightly elliptical shape. An ellipse has two axes with one axis shorter than the other. The shorter axis termed width is smaller than the diameter of the straight cylinder section and the longer axis termed length is greater than the diameter. A spherical piston 4 which is guided in the cylinder opening 5 has a diameter which corresponds to the inside width (diameter) of the cross-sectional shape of the cylinder sections 1 and 3. Since the inside width a in the curved cylinder section 2 (elliptical shape) is smaller than the inside width b in the straight cylinder sections 1 and 3, the spherical piston 4 jams in the curvature region 2. This prevents the pressure of a gaseous or liquid propellant, i.e. a fluid medium, which acts on the spherical piston 4 in the direction of the arrow shown in FIG. 1 from being used entirely for accelerating the piston 4. Rather, a major part of the driving energy supplied is used for deformation work if the spherical piston 4 consists of an elastic material, to enable the spherical piston to adapts itself to the changed cross-sectional shape.

In the embodiment example according to FIG. 2, a spherical piston 6 is used which has a circular, radial cut 7, in which a ring-shaped, elastic sealing element 8 is guided in such a manner that it can adapt its cross-sectional form to the cross section which changes, that is, narrowed in the curvature region 2 shown in FIG. 1. As FIG. 2 shows, the diameter of the spherical piston 6 is smaller here than the smallest inside width a (FIG. 1) of the cylinder 9. However, the danger exists here that the piston is turned into the position shown in dashed lines in FIG. 2 because of different friction conditions when it passes into the curved cylinder section 2 (FIG. 1). As a result, the sealing between the piston and cylinder 9 is impaired.

In the embodiment example according to FIG. 3, a spherical piston 10, for instance of metallic material is connected on the pressure side, indicated by an arrow, to a cup-shaped sealing element 11. The sealing element 11 consists of a resilient and preferably elastic material and has in the cylinder axis a connecting pin 12. The cup rim 13 of sealing element 11 which is expanded preferably in funnel-shape, rests against the inside circumference of the cylinder 9, and can adapt itself without difficulty to the changed cross-sectional shape in the curved cylinder section 2 (FIG. 1). The spherical piston 10 has an axial hole 14 which is expanded in funnel-shape toward the sealing element 11. The connecting pin 12 of the sealing element 11 is pushed through this axial hole 14 and is riveted, welded or the like at the other end for firm connection between the sealing element 11 and the spherical piston 10 at the point 15. If pressure acts in the direction of the arrow as shown in FIG. 3, the cup-shaped sealing element 11 rests against the cylinder inside wall, the main forces being taken up by the sphere in front. Guidance of the cup-shaped sealing element at the circumference of the inside wall of the cylinder, assures retention of the piston's overall position which is aligned relative to the cylinder axis. This is illustrated in the curvature region 2 of FIG. 3 by showing the piston 10 in this curvature region. After the piston 10 and sealing element 11 leave the curved cylinder section 2 (FIG. 1), the cup rim 13 of the sealing element 11 is interrupted at no point along its cylinder guidance. The embodiment example explained is suitable for unilateral pressure action in the direction of the arrow. A driving device for bilateral pressure action which corresponds substantially to the embodiment example according to FIG. 3 is shown in FIG. 4. A spherical piston 16 is used which is provided with an axial hole 17 which is expanded toward both sides in funnel-fashion. Here, cup-shaped sealing elements 18 and 19, each substantially corresponding to the sealing element 11 according to FIg. 3, are arranged on both sides of the spherical piston 16 and are connected to each other by a connecting pin 20 guided in the axial hole 17. The sealing element 18 has preferably an integrally formed-on connecting pin 20 which extends through the axial hole 17 and is connected to the other sealing element 19, as by riveting or welding. Here too, the spherical piston 16 has a diameter which is smaller than the smallest width a (FIG. 1) of cylinder 9. As illustrated by arrows in FIG. 4, in this embodiment pressure can act from the one or from the other side of the cylinder 9. In either direction of pressure the sealing elements take care of good sealing and low friction guidance of the piston in the cylinder 9.

Figure 5:
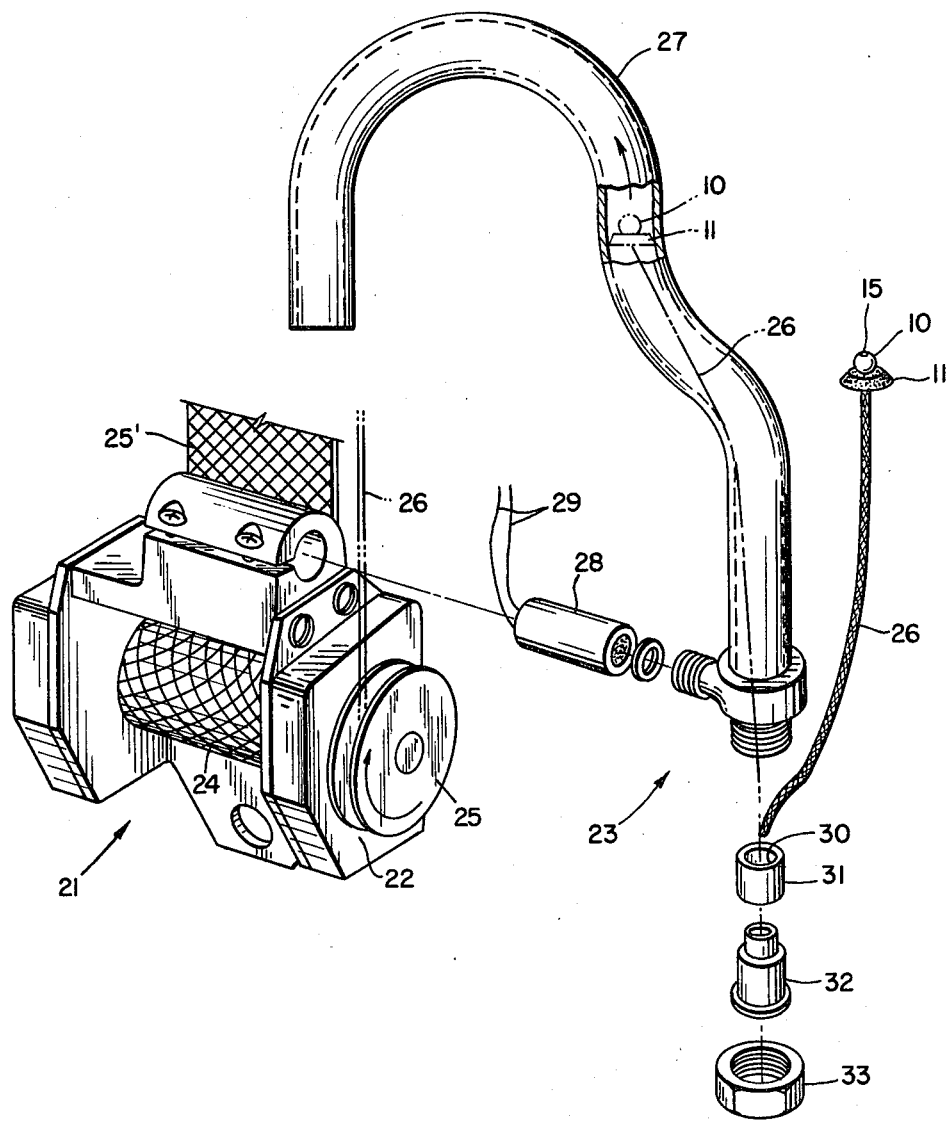
FIG. 5 shows the relationship of the driving device with a backtightening device of a safety belt system.

FIG. 5 shows an automatic roll-up device 21 with a back-tightening device 22 in an exploded view, comprising a cylinder/piston-drive arrangement 23 in which the curved cylinder 27 is partly cut away to show the piston 10 and sealing element 11. The automatic roll-up deivce 21 has a rotatable belt shaft 24 for a flexible strap 25. The backtightening device 22 is connected with the belt shaft 24 in form of a rope pulley 25 so that the belt 25 is rolled up if the rope pulley is rotated in direction of the arrow, and the belt is thus tightened around the body of the user of the vehicle. In the normal position, the rope pulley 25 stands still, and is arrested by a preset safety holding means which is not shown. A flexible tension cord 26 is arranged on the rope pulley 25, with the cord connected to the piston-sealing element 10/11 of the drive arrangement 23. The drive arrangement is a curved cylinder 27 with several bends, having basically an internal circular cross section in which the piston-sealing element 10/11 is guided. A pyrotechnical drive 28 is connected to the cylinder 27 at its foot-end. Drive 28 is provided with a drive charge which can be operated by an electrical ignition pulse conducted through electrical lines 29. This ignition pulse is triggered in the case of a crash, causing the exploding drive charge to generate a high pressure inside of the cylinder 27, which drives the piston-sealing element 10/11 upward in the direction of the arrow. The cylinder is closed by the bushing 31, the sleeve 32 and the screw 33 except for a hole 30 for passing the cord 26. The piston-sealing element 10/11 corresponds essentially to the one in FIG. 3. The tension cord 26 is moved upward by the motion of the piston-sealing element 10/11, whereby the rope pulley 25 is rotated a certain angle after the safety holding means, for example a shear pin, has been broken.

I claim:

1. Driving device, including a pyrotechnical driving device for a backtightening device of a safety belt system comprising a cylinder having a curved cylinder section in which its cross-section deviates from a circular cross-section and its width is smaller than its length as measured by the cross-section's two axes, a non-resilient spherical piston in the cylinder unencumbered by a connecting rod and drive mechanism necessary to drive the piston but which piston can be driven by a fluid propellant, said spherical piston having a diameter smaller than the smallest inside width of the cylinder and a resilient sealing element which is cup-shaped with its cup rim in contact with the interior wall of the cylinder disposed on the driving side of the spherical piston which resilient sealing element during movement of the piston through the cylinder adapts itself to the changing cross-sectional shape of the curved cylinder and retains a constant position relative to the cylinder axis when passing through the cylinder curvature and, wherein the sealing element has a connecting pin which is axial to the cylinder axis and which connecting pin is fastened in an axial hole of the spherical piston.

2. Driving device according to claim 1, wherein the axial hole is enlarged outward in the spherical piston in funnel fashion.

3. Driving device according to claim 1, wherein a second resilient sealing element is arranged on the side of the spherical piston opposite the first sealing element, and wherein the second sealing element has a second connecting pin which is axial to the cylinder axis and which second connecting pin is fastened in an axial hole of the spherical piston.

4. Driving device according to claim 1, wherein a second sealing element is arranged on the side of the spherical piston opposite the first sealing element, and wherein one of the sealing elements has a connecting pin which extends through an axial hole of the spherical piston and is connected to the other sealing element.

5. Driving device according to claim 4, wherein the axial hole is expanded in funnel fashion on both sides of the spherical piston.

6. Driving device according to claim 3, wherein the axial hole is expanded in funnel fashion on both sides of the spherical piston.

* * * * *